July 8, 1969   D. F. SMITH ET AL   3,454,419
NYLON-COATED PAPER AND PROCESS FOR PRODUCING SAME
Filed May 18, 1965
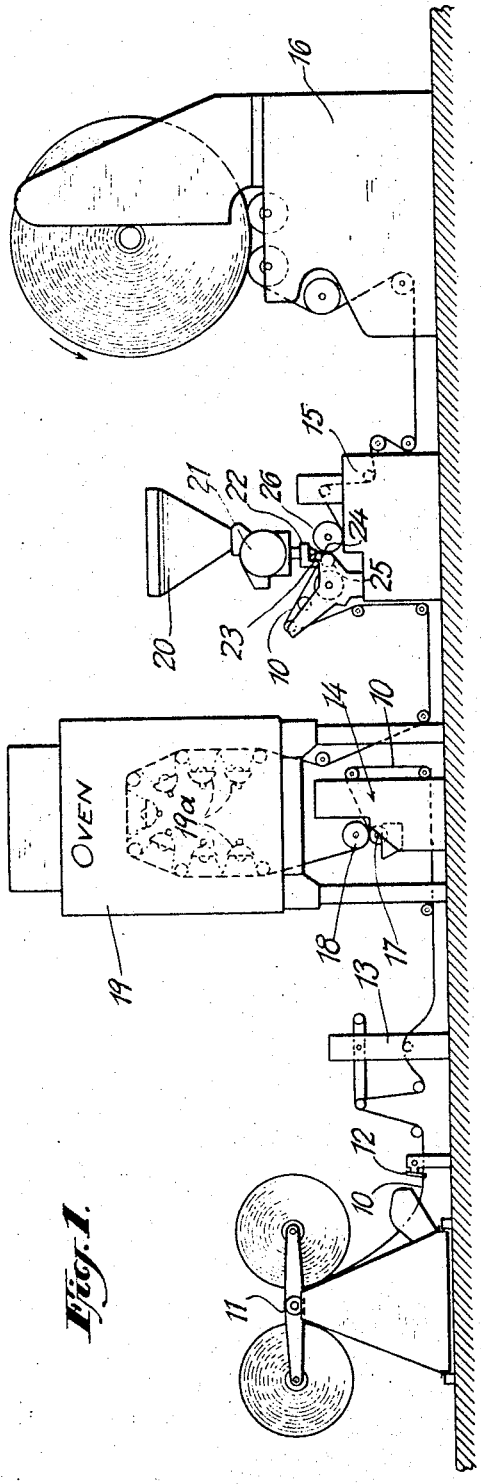
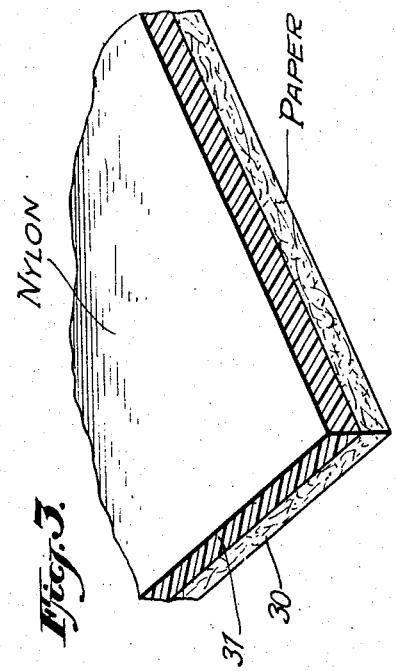
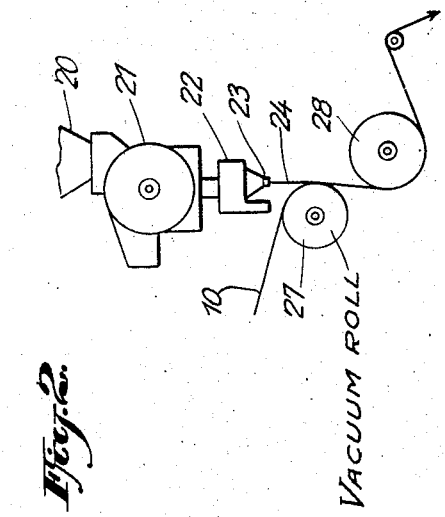

3,454,419
**NYLON-COATED PAPER AND PROCESS
FOR PRODUCING SAME**
Donald F. Smith, Clifton, N.J., and James Russell, New
City, and David R. Deretchin, Suffern, N.Y., assignors
to St. Regis Paper Company, New York, N.Y., a corporation of New York
Filed May 18, 1965, Ser. No. 456,687
Int. Cl. B44d 1/16; D21h 1/10
U.S. Cl. 117—76                                                14 Claims

ABSTRACT OF THE DISCLOSURE

A nylon-coated paper having a primer film of polyvinyl carboxylic acid on the fibers of at least one surface and a coating of nylon on the primer film, and processes for producing such coated paper.

---

This invention relates to a nylon-coated paper and the process for producing same, and more particularly it relates to a process for making a paper having a firmly adherent coating of nylon and the product made by the process.

It is known to coat paper with organic materials. Examples of such materials which have been long known in the art are papers and paperboards coated with paraffins and waxes of various types. More recently, with the advances in producing synthetic organic materials, it has become common to coat paper and boardstocks with wax-like and other synthetic materials for the purpose of imparting oil resistance, water impermeability, and other desired properties to the paperstock.

Typical of such synthetic materials or "plastics" which have been used to coat papers are the polyolefins such as polyethylene, acrylics, and polyesters. A number of different processes have been used to coat paperstocks. For example, it is known to deposit polyethylene onto paper from dispersions, emulsions, or solutions thereof. Another method which has been used successfully more recently is so-called "extrusion coating" of paper with polyethylene. In extrusion-coating a film of polyethylene is extruded from a suitable die and, while still hot and in a plastic condition, is passed together with the paper to be coated through the nip of a pair of rolls to bond the polyethylene to the paper. Generally, in such a process the paper web is moved at a higher speed than the extruded polyethylene film so that the film is drawn thinner and tightly bonded to the paper fibers.

Another process for bonding polyethylene to the paper is the so-called Lepel process in which a previously formed film of polyethylene is passed into the nip between two rolls, the polyethylene having previously been passed through a corona discharge. The corona discharge produces an electrostatic charge in the polyethylene which, together with the pressure in the rolls, bonds the polyethylene to the paper.

A method which has also been used for coating polyethylene onto paper is flame-treating, a process involving passing the paper rapidly through a flame to bond the polyethylene to the paper substrate. This method suffers from the disadvantage that the paper is frequently dried excessively and loses some of its desirable properties. Further, the flaming operation is hazardous.

While polyethylene is suitable for the coating of paper in connection with many practical applications, other organic materials have special properties or supply deficiencies which exist inevitably in polyethylene-coated paper. It has, for example, been desired to coat paper with a thin film of a highly polymeric polyamide such as nylon. Some success has been attained by coating paper with a solution of lower polyamides and evaporating the solvent. The difficulty with this method is that the desirable highly polymeric nylons cannot readily be dissolved in available solvents and hence cannot be coated on paper.

Attempts have been made to use the Lepel electrostatic process, but a good bond of paper to nylon is not obtained and the film of nylon is relatively readily stripped from the paper. Attempts have also been made to extrusion-coat paper with nylon, but such attempts have been unsuccessful due to the failure of the nylon to bond to the paper. This failure is apparently due in part to the fact that the nylon cools rapidly from the high temperature at which it is melted so that by the time it contacts the paper in the nip it is not as fluid as necessary. Poor bonding with extrusion coating is especially acute in the case of highly crystalline nylons which have a high melting point and are very viscous. If higher temperatures are used for the extrusion operation so as to reduce the viscosity of the nylon, some thermal decomposition takes place and changes some of the very properties of the highly crystalline nylon which it is most desired to have in a paper coating. Heretofore it has been impossible to obtain a strong nylon to paper bond with the crystalline and highly polymeric nylons.

This invention provides a method of firmly bonding nylon on paper. This invention further provides a paper coated with nylon wherein the nylon-to-paper bond is tenacious and cannot be stripped away from the paper fibers.

Briefly, this invention relates to a method of producing a nylon-coated paper by priming the paper with a coating of a polyvinyl carboxylic material and subsequently coating nylon onto the primed paper. The product of this invention is a paper with two superposed coatings on at least one surface of the paper. The first coating is a polyvinyl carboxylic material, and the second coating is a film of nylon. The preferred primers are polyvinyl carboxylic acids.

The properties of the nylon-coated paper of this invention are superior to polyethylene-coated paper in many applications. The nylon-coated papers of this invention have a high degree of resistance to penetration by gases, vapors, greases, and oils. They have excellent abrasion resistance. One of their outstanding properties is their resistance to creasing or puncturing. This property makes the nylon-coated papers of this invention especially adapted for use in wrapping, for example, metal objects having sharp edges and the like. This superior puncture resistance appears to be due to the ability of the nylon coating to elongate and orient in areas of high stress so that the nylon flows in a high-stress area rather than puncturing. The papers produced according to the method of this invention thus are highly useful among other things for wrapping both delicate instrument parts and also for wrapping heavy gears, castings, and the like.

As used herein, the term "paper" is meant to include non-woven webs of fibers which are chiefly cellulosic. For example, papers obtained from wood by any of the known papermaking processes can be used in the practice of this invention. Further, the cellulosic fibers may be of plant origin other than from trees. For example so-called rag content papers containing cotton fibers and the like can also be used as the paper substrate in the practice of this invention.

Where the papers of this invention are to be used as packaging materials and high strength is desired, kraft paper has been found especially suited for use. While the paper can contain small quantities of solid materials it will be understood that the papers to be coated should be clean and free from dirt. Further, it is preferred that the papers be essentially free from other particulate materials frequently used to size or opacify papers, such as clay, starch, pigments, titanium dioxide and other pigments, and the like. Large amounts of such solid materials in the web will decrease the adhesion of the nylon to the paper, even with the primer of this invention.

Although it would be expected that the application of an acidic material to the paper would weaken the fibers and result in an unsatisfactory product, it has been surprisingly found that not only does the polyvinyl carboxylic material not substantially weaken the paper but in fact it primes the fibers so that an extruded film of nylon will adhere tenaciously to the paper. As used herein, the term "polyvinyl carboxylic material" will be understood to mean polymerized carboxylic acids which are substantially unesterified.

The preferred polyvinyl carboxylic acids used in the practice of this invention have an equivalent weight of not more than about 110. It will be understood that the equivalent weight of a polymeric carboxylic acid is a measure of the number of carboxyl groups occurring along the polymeric chain and can be considered equal to the molecular weight of the polymer divided by the number of carboxyl groups.

Any vinyl carboxylic acid which can be polymerized with itself or with another material can be used to prepare the polyvinyl carboxylic acids used in this invention. In one aspect of this invention a preferred polyvinyl carboxylic acid is the homopolymer of acrylic acid, namely, polyacrylic acid. In another aspect of this invention a preferred acid is maleic anhydride. It will be understood that the dicarboxylic vinylene material, maleic acid, can also be used as well as other such vinyl-derived acids as fumaric acid and the like.

Where a dicarboxylic acid is used to prepare the polyvinyl carboxylic material, it will be understood that copolymers are also included within the ambit of this invention. An example of a preferred copolymer which is used as the polycarboxylic acid material in this invention is the polymerized reaction product of methyl vinyl ether and maleic acid.

Where pure polyacrylic acid homopolymer is used in this invention, it will generally be found to have an equivalent weight on the order of about 72. The equivalent weight which can be obtained when a copolymer of a dicarboxylic vinylene or vinylidene copolymer with another vinyl material is used can be varied. For example, the copolymer prepared from equal amounts of maleic anhydride and methyl vinyl ether will have an equivalent weight of about 87 after hydration. A copolymer of 60 parts of methyl vinyl ether and 40 parts of maleic acid will have an equivalent weight after hydration of about 93. As the amount of maleic acid in the copolymer is decreased, a point is approached at which the acidity of the polyvinyl carboxylic material is too low effectively to act as a primer. Generally, with a maleic acid-methyl vinyl ether copolymer the priming action is noticeably poorer when the polymer contains 30 percent or less maleic acid. Accordingly, it is preferred that the equivalent weight be not more than about 110. For better performance in some uses it is further preferred that the equivalent weight be not more than about 95.

The foregoing disclosure has been in terms of homopolymers or copolymers of two materials, but it will be understood that the polyvinyl carboxylic material can be a polymer of three or more materials or it can be a mixture of, for example, a homopolymer and a copolymer. It will also be understood that the carboxylic acid groups should preferably not be esterified to any significant degree.

The polyvinyl carboxylic material can be applied to the paper by any means. The material can be applied by itself or from a solution, suspension, or emulsion having a suitable vehicle. It can be applied by doctor blade, padding, dipping, spraying, and the like. It will be understood that the primer can be applied to one side or both sides of the paper, depending upon one or both sides of the paper are to be nylon-coated. When it is desired to coat both sides with nylon, the paper can be saturated with polyvinyl carboxylic material by one of the foregoing methods or the acid can be applied to one surface and then drawn through to the opposite surface by the use of a vacuum roll.

In general, relatively small quantities of polyvinyl carboxylic acid are used as a primer in carrying out this method. Good adhesion is obtained at an acid usage as low as 0.1 pound per ream. (A "ream," as used herein, is 3000 square feet of paper surface). Generally, there is little advantage to be gained by applying the acid to the paper substrate at rates greater than about 1.5 pound per ream, and the economy of the process is adversely affected by the use of excessive amounts of polyacrylic acid. It is preferred to apply the polyvinyl carboxylic acid at the rate of from about ¼ to about 1 pound per ream.

After the polyacrylic acid is applied, residual solvent or vehicle, if these were used, should be removed prior to the extrusion coating with nylon. It is preferred that the polyacrylic acid primer not be entirely dry to the touch prior to deposition of the nylon film thereon.

The polycarboxylic acid primer of this invention is suitable for use with any type of nylon. The nylon can be nylon 66, such as produced from hexamethylenediamine and adipic acid; nylon 610 produced, for example, from hexamethylenediamine and sebacic acid; nylon 6 such as is produced from $\epsilon$-aminocaproic acid; or nylon 11 such as produced from $\omega$-aminoundecanoic acid as well as to mixtures of two or more of these or other nylons. For maximum strength and crease- or penetration-resistance, it is preferred to use the highly crystalline nylons, such as high-polymer nylon 66. This invention makes it possible to coat such highly crystalline nylons without subjecting them to excessively high temperatures in an attempt to reduce their viscosity.

These nylons can be extrusion-coated on one or both sides of the paper after suitable treatment with the polyacrylic acid. The nylon can be extrusion-coated with any available extrusion coating equipment. It can be coated on to the paper by drawing the paper and the extruded film of nylon through a nip as with conventional machines or the vacuum extrusion coating technique as disclosed in U.S. Patent 3,165,432 can be used.

Regardless of the particular extrusion coating technique used, the process of this invention provides a coated paper having excellent fiber-tearing adhesion. As used herein, fiber-tearing adhesion represents a degree of adhesion such that, when an attempt is made to separate the coating from the paper, the fibers in contact with the nylon adhere to the nylon and are torn from the thickness of the paper. The fiber tearing bonds produced by this invention are so strong that the paper is actually destroyed or reduced in thickness, as opposed to the type of adhesion wherein it is possible cleanly too strip off a nylon film from the paper substrate without tearing either the film or the paper.

The process of this invention permits the application of as little as 1.5 to 2 pounds of nylon to a ream of paper while obtaining outstanding fiber-tearing adhesion. The amount of nylon employed to coat the paper can be any quantity in excess of about 1.5 pounds per ream which produces the desired degree of flexibility and economy in the finished coated paper. Generally, it has been found that rates of nylon application on the order of from about 1.5 to about 20 pounds per ream produce excellent results in the practice of this process. It is especially preferred that the amount of nylon coated on the paper be in the range of from about 2 to about 15 pounds per ream.

If the invention is to be carried out by generally conventional extrusion coating, one form of such apparatus is shown in the accompanying drawings wherein:

FIGURE 1 is a schematic representation of apparatus with which the process can be carried out;

FIGURE 2 is a schematic illustration of an alternative arrangement for combining the paper and nylon film; and FIGURE 3 is a fragmentary sectional view of an example of the product of this invention.

In further explanation of the process of this invention, FIGURE 1 shows a web of paper 10 passing successively from a turret unwind station 11 through a suitable web guide 12 to tension assembly 13, priming unit 14, extruder-laminator station 15 where the web is coated with nylon, and finally to a drum winder 16 which receives the nylon-coated paper. At the priming station the web is passed through the nip of rolls 17 and 18. A uniform covering of polyvinyl carboxylic acid is produced on roll 18 from a flooded nip between roll 18 and another roll not shown in the figure. Web 10 is uniformly coated with polyvinyl carboxylic acid taken up from roll 18. Web 10 then passes into oven 19 where the solvent from the acid is largely removed by heating the web with radiant heaters as at 19a. From oven 19 the web then passes to the extrusion lamination station 15.

At the extrusion lamination station 15 nylon pellets are fed from hopper 20 into an electrically heated extruder 21. This extruder melts the nylon pellets and forces them into die box 22 and through die 23 to form a web or film of viscous nylon 24. The paper web 10 and extruded nylon film 24 are fed together into the nip between a rubber roller 25 and a water chilled roller 26. The paper web is carried through this nip at a somewhat higher lineal speed than the film 24 is being extruded so that the nylon film 24 is stretched and thinned before coming into contact with the primed paper web. The nylon film is rapidly cooled and set on the paper by the cooling action of roller 26. From the extrusion lamination station in the embodiment shown in FIGURE 1 the nylon-coated web is rewound on a drum winder 16.

It will be understood that prior to winding on the drum winder 16, the nylon-coated web could be slit, cut, or trimmed; coated on the opposite surface, after polyacrylic acid-priming, with another extruded film of nylon; coated on one or both surfaces with another plastic material such as polyethylene; or laminated with another web such as a layer of metal foil. These optional operations can be performed on conventional known apparatus.

FIGURE 2 shows an alternate method of laminating the nylon film and paper web according to the method disclosed in U.S. Patent 3,165,432. The polyacrylic acid-primed web 10 is passed over vacuum roll 27 and web 24 is firmly bonded to the paper under the force of the vacuum being drawn through roll 27. The nylon coated web is then passed over roll 28 and sent to the drum winder station as was described in connection with FIGURE 1. In the embodiment shown in FIGURE 2, the web 10 is moving at a slightly higher speed than that at which film 24 is extruded, so that once again film 24 is drawn thinner over the paper web.

FIGURE 3 is a greatly enlarged view of the product of this invention in which 30 is the paper substrate and 31 is the continuous pin hole-free nylon coating applied to the paper. The acrylic primer is understood to coat the individual fibers comprising the surface of paper 30 with a film, and this is not shown in FIGURE 3.

The following examples are given to illustrate certain embodiments of this invention.

EXAMPLE I

A 40-pound kraft paper is primed with an aqueous polyacrylic acid solution in an amount sufficient to deposit 0.25 pound of polyacrylic acid per ream. The bulk of the water is then removed and nylon 66 is extruded over the primer through a roll nip at the rate of 12 pounds per ream.

Fiber-tearing adhesion of the nylon to the paper is obtained immediately upon cooling of the coated paper. Fiber-tearing adhesion means that when it is attempted to separate the nylon coating from the papeer substrate, the fibers on the surface of the paper adhere to the nylon and are stripped off of the surface of the paper.

EXAMPLE II

A 40-pound natural kraft is primed with an aqueous solution of polyacrylic acid in an amount sufficient to deposit one pound of polyacrylic acid per ream of paper. Du Pont 2345 nylon is then extruded over the primed side of the paper through a roller nip at the rate of 4 pounds per ream of paper.

Fiber-tearing adhesion is obtained immediately upon cooling the nylon-coated paper.

It will be understood that other papers, as described above, can be primed and nylon-coated according to the process of this invention. Rag-content papers, tissue papers, board stock, mechanical pulp papers, soda pulp papers, sulfite pulp papers, and other cellulosic papers can be used in this example in lieu of the kraft or sulfate pulp paper with comparable results. The paper can also include reinforcing fibers, such as asbestos, glass, synthetic staple fibers, and the like.

An example of the use of bleached kraft paper follows:

EXAMPLE III

A 50-pound bleached kraft paper is primed with an aqueous solution of polyacrylic acid to deposit 0.5 pound per ream of polyacrylic acid on the paper. After removal of the bulk of the water, Du Pont 2353 nylon is extruded over the primer at the rate of 8 pounds per ream of paper.

After the nylon-coated paper has cooled to room temperature, an attempt to peel the nylon coating from the surface of the paper tears the surface of the paper and leaves the surface fibers clinging to the nylon. This indicates that good fiber-tearing adhesion is obtained.

EXAMPLE IV

A 50-pound bleached kraft is primed with an aqueous solution of "Gantrez AN" poly(methyl vinyl ether/maleic anhydride) made by the General Aniline and Film Corporation, in an amount sufficient to deposit 0.5 pound of polymer per ream of paper. After the bulk of the water has been removed Spencer 606 nylon 66 is extruded over the primed paper at the rate of 10 pounds per ream.

Fiber-tearing adhesion is obtained immediately upon cooling the nylon-coated paper to room temperature.

Although certain particular embodiments of the invention are herein disclosed for purposes of explanation, further modifications thereof, after study of this specification, will be apparent to those skilled in the art to which the invention pertains.

We claim:

1. A process for coating paper which comprises priming the paper by applying to at least one surface thereof a polyvinyl carboxylic acid in a liquid vehicle, the acid having an equivalent weight of not more than 110 to coat the individual fibers comprising the surface, removing the bulk of the vehicle so the primer is not entirely dry to the touch, and subsequently coating the primed surface with nylon.

2. A paper having a primer film of a polyvinyl carboxylic acid coating the individual fibers of at least one surface and a coating of nylon on the primer film, the acid having an equivaleent weight of not more than about 110.

3. A process for coating paper which comprises priming at least one surface of a paper with from about 0.1 to about 1.5 pounds per 3000 square feet of paper of a polyvinyl carboxylic acid in a liquid vehicle, the acid having an equivalent weight of not more than about 110, to coat the individual fibers comprising the surface, removing the bulk of the vehicle so the coat is not entirely dry to the touch, and subsequently extrusion-coating the primed surface with nylon.

4. A process for coating paper which comprises priming at least one surface of a paper with from about 0.1 to about 1.5 pounds per 3000 square feet of paper of a polyvinyl carboxylic acid in a liquid vehicle, the acid having an equivalent weight of not more than about 110, to coat the individual fibers comprising the surface, removing the bulk of the vehicle so the coat is not entirely dry to the touch, and subsequently extrusion-coating the primed surface with from about 1.5 to about 20 pounds of nylon per 3000 square feet of paper.

5. A process for coating paper which comprises priming one surface of paper with from about 0.1 to about 1.5 pounds per 3000 square feet of paper of a polyvinyl carboxylic acid in a liquid vehicle, the acid having an equivalent weight of not more than about 95 to coat the individual fibers comprising the surface, removing the bulk of the vehicle so the coat is not entirely dry to the touch, and subsequently extrusion-coating the primed surface with from about 2 to about 15 pounds of nylon per 3000 square feet of paper.

6. A process for coating paper which comprises priming one surface of paper with from about 0.1 to about 1.5 pounds per 3000 feet of paper of a polyvinyl carboxylic acid in a liquid vehicle, the acid being selected from the group consisting of polymers of acrylic acid and of maleic acid and the polymer having an equivalent weight of not more than about 95, to coat the individual fibers comprising the surface, removing the bulk of the vehicle so the coat is not entirely dry to the touch, and subsequently extrusion-coating the primed surface with from about 2 to about 15 pounds of nylon per 3000 square feet of paper.

7. A process for coating paper which comprises priming one surface of the paper with from about 0.1 to about 1.5 pounds per 3000 square feet of paper of polyacrylic acid in a liquid vehicle, the acid having an equivalent weight not more than about 95 to coat the individual fibers comprising the surface, removing the bulk of the vehicle so the coat is not entirely dry to the touch, and subsequently extrusion-coating the primed surface with from about 2 to about 15 pounds of nylon per 3000 square feet of paper.

8. A process for coating paper which comprises priming one surface of paper with from about 0.1 to about 1.5 pounds per 3000 square feet of paper of a copolymer of maleic acid and methyl vinyl ether in a liquid vehicle, the copolymer having an equivalent weight of not more than about 95, to coat the individual fibers comprising the surface, removing the bulk of the vehicle so the coat is not entirely dry to the touch, and subsequently extrusion-coating the primed surface with from about 2 to about 15 pounds of nylon per 3000 square feet of paper.

9. A paper having a primer film of from about 0.1 to about 1.5 pounds per 3000 square feet of paper of a polyvinyl carboxylic acid with an equivalent weight of not more than about 110 on the individual fibers of at least one surface and a coating of nylon on the primer film.

10. A paper having a primer film of from about 0.1 to about 1.5 pounds per 3000 square feet of paper of a polyvinyl carboxylic acid with an equivalent weight of not more than about 110 on the individual fibers of at least one surface and a coating of from about 1.5 to about 20 pounds per 3000 square feet of paper of nylon on the primer film.

11. A paper having a primer film of from about 0.1 to about 1.5 pounds per 3000 square feet of paper of a polyvinyl carboxylic acid with an equivalent weight of not more than about 95 on the individual fibers of at least one surface and a coating of from about 2 to about 15 pounds per 3000 square feet of paper of nylon on the primer film.

12. A paper having a primer film of from about 0.1 to about 1.5 pounds per 3000 square feet of paper of a polyvinyl carboxylic acid selected from the group consisting of polymers of acrylic acid and of maleic acid on the individual fibers of at least one surface, the polymers having an equivalent weight of not more than about 95, and a coating of from about 2 to about 15 pounds per 3000 square feet of paper of nylon on the primer film.

13. A paper having a primer film of from about 0.1 to about 1.5 pounds per 3000 square feet of papeer of polyacrylic acid with an equivalent weight of not more than about 95 on the individual fibers of at least one surface and a coating of from about 2 to about 15 pounds per 3000 square feet of paper of nylon on the primer film.

14. A paper having a primer film of from about 0.1 to about 1.5 pounds per 3000 square feet of paper of a copolymer of maleic acid and methyl vinyl ether on the individual fibers of at least one surface, the copolymer having an equivalent weight of not more than about 95, and a coating of from about 2 to about 15 pounds per 3000 square feet of paper of nylon on the primer film.

References Cited
UNITED STATES PATENTS

| | | |
|---|---|---|
| 2,443,450 | 6/1948 | Graham et al. |
| 3,000,758 | 9/1961 | Hennemann. |
| 3,262,805 | 7/1966 | Aoki. |

WILLIAM D. MARTIN, *Primary Examiner.*

R. HUSACK, *Assistant Examiner.*

U.S. Cl. X.R.

117—155